(12) United States Patent
Gardiner et al.

(10) Patent No.: US 10,100,253 B2
(45) Date of Patent: Oct. 16, 2018

(54) METHOD OF PREPARING A BIREFRINGENT POLYMER FILM

(71) Applicant: Merck Patent GmbH, Darmstadt (DE)

(72) Inventors: Iain Gardiner, Southampton (GB);
Owain Llyr Parri, Ringwood (GB);
Tara Perrett, Bournemouth (GB);
Joseph Sargent, Southampton (GB);
Jack Bradford, Southampton (GB);
Sarah Whitehouse, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 332 days.

(21) Appl. No.: 14/408,600

(22) PCT Filed: May 24, 2013

(86) PCT No.: PCT/EP2013/001545
§ 371 (c)(1),
(2) Date: Dec. 17, 2014

(87) PCT Pub. No.: WO2014/000846
PCT Pub. Date: Jan. 3, 2014

(65) Prior Publication Data
US 2015/0166892 A1    Jun. 18, 2015

(30) Foreign Application Priority Data

Jun. 26, 2012   (EP) .................... 12004787

(51) Int. Cl.
*C09K 19/38*   (2006.01)
*C09K 19/54*   (2006.01)
(Continued)

(52) U.S. Cl.
CPC ...... *C09K 19/3852* (2013.01); *C09K 19/3861* (2013.01); *C09K 19/54* (2013.01);
(Continued)

(58) Field of Classification Search
CPC ....................................................... B05D 1/00
See application file for complete search history.

(56) References Cited

U.S. PATENT DOCUMENTS 6,300,991 B1   10/2001   Schadt et al.
7,597,942 B2   10/2009   May et al.
(Continued)

FOREIGN PATENT DOCUMENTS

CN       100537705 C    9/2009
EP         1795575 A1   6/2007
(Continued)

OTHER PUBLICATIONS

International Search Report from PCT/EP2013/001545 dated Sep. 23, 2013.
(Continued)

*Primary Examiner* — Dah-Wei D. Yuan
*Assistant Examiner* — Kristen A Dagenais-Englehart
(74) *Attorney, Agent, or Firm* — Millen White Zelano and Branigan, PC; Csaba Henter

(57) ABSTRACT

The invention relates to a method of preparing a polymer film and to the use of such polymer film as in liquid crystal displays (LCDs) or other optical or electrooptical devices, for decorative or security applications, as alignment layer or optical retardation film.

21 Claims, 3 Drawing Sheets

(51) Int. Cl.
*C09K 19/58* (2006.01)
*G02B 5/30* (2006.01)
*C09K 19/04* (2006.01)
*C09K 19/20* (2006.01)
*C09K 19/34* (2006.01)

(52) U.S. Cl.
CPC .......... *C09K 19/588* (2013.01); *G02B 5/3083* (2013.01); *C09K 2019/0448* (2013.01); *C09K 2019/2035* (2013.01); *C09K 2019/2078* (2013.01); *C09K 2019/2092* (2013.01); *C09K 2019/3433* (2013.01); *C09K 2219/03* (2013.01)

(56) References Cited

U.S. PATENT DOCUMENTS

| | | | |
|---|---|---|---|
| 7,824,571 | B2 | 11/2010 | Ishizaki |
| 8,455,563 | B2 | 6/2013 | Parri et al. |
| 2003/0080321 | A1* | 5/2003 | Farrand ............... C07C 45/673 252/299.01 |
| 2004/0066503 | A1* | 4/2004 | Hubner ............... G01B 11/18 356/34 |
| 2006/0222783 | A1* | 10/2006 | Hayashi ............ C09K 19/3852 428/1.1 |
| 2008/0143943 | A1* | 6/2008 | May ...................... C09K 19/18 349/117 |
| 2008/0180608 | A1 | 7/2008 | Ishizaki |
| 2011/0178200 | A1 | 7/2011 | Parri et al. |

FOREIGN PATENT DOCUMENTS

| | | | |
|---|---|---|---|
| JP | | H09-222605 A | 8/1997 |
| JP | | 2008-512504 A | 4/2008 |
| WO | | 2006027076 A1 | 3/2006 |
| WO | | 2009086911 A1 | 7/2009 |
| WO | WO 2009086911 A1 * | 7/2009 | ............. C09K 19/18 |
| WO | WO-2009086911 A1 * | 7/2009 | ............. C09K 19/18 |

OTHER PUBLICATIONS

Japanese Office Action dated Feb. 3, 2017, issued in corresponding JP Application No. 2015-518874, 8 pages.
English translation Abstract of JP2008512504A published Apr. 24, 2008 (1 page).
English translation Abstract of JPH09222605A published Aug. 26, 1997 (2 page).
European Office Action dated Feb. 15, 2017 issued in corresponding EP 13 729 597.8, 5 pages.
English Translation of CN100537705C published Sep. 9, 2009 (11 pages).

* cited by examiner

METHOD OF PREPARING A BIREFRINGENT POLYMER FILM

FIELD OF INVENTION

The invention relates to a method of preparing a polymer film, the film as such, and to the use of such polymer film in liquid crystal displays (LCDs) or other optical or electrooptical devices, for decorative or security applications, as alignment layer or optical retardation film.

BACKGROUND AND PRIOR ART

Optical compensators are used to improve the optical properties of liquid crystal displays (LCD), such as the contrast ratio and the grey scale representation at large viewing angles. For example in uncompensated displays of the TN or STN type at large viewing angles often a change of the grey levels and even grey scale inversion, as well as a loss of contrast and undesired changes of the color gamut are observed.

An overview of the LCD technology and the principles and methods of optical compensation of LCDs is given in U.S. Pat. No. 5,619,352, of which the entire disclosure is incorporated into this application by way of reference.

As described in U.S. Pat. No. 5,619,352, the contrast of a display at wide viewing angles can be improved by a negatively birefringent C-plate compensator. However, such a compensator does not improve the greyscale representation of the display. On the other hand, U.S. Pat. No. 5,619,352 suggests using a birefringent O-plate compensator to suppress or even eliminate grey scale inversion and improve the grey scale stability.

The terms 'O-plate' and 'A-plate' as used in U.S. Pat. No. 5,619,352 and throughout this invention have the following meanings. An 'O-plate' is an optical retarder utilizing a layer of a positively birefringent (e.g. liquid crystal) material with its principal optical axis oriented at an oblique angle with respect to the plane of the layer.

An 'A-plate' is an optical retarder utilizing a layer of uniaxially birefringent material with its extraordinary axis oriented parallel to the plane of the layer, and its ordinary axis (also called 'a-axis') oriented perpendicular to the plane of the layer, i.e. parallel to the direction of normally incident light.

As an O-plate retarder for example an optical retardation film comprising a layer of a liquid crystal or mesogenic material with tilted structure can be used. As an A-plate retarder an optical retardation film may comprise a layer of a positively birefringent liquid crystal or mesogenic material with planar orientation.

Those retardation films are commonly used in liquid crystal displays to convert between linear and circular polarized light. The skilled artisan is aware that reactive mesogen layers can be created to provide such retardation layers. For example, RMS03001 (from Merck KGaA, Darmstadt, Germany) as a commercially available solution of reactive mesogens can be spin coated and photo-polymerised to provide a planar aligned nematic film. By varying the coating conditions, it is possible to produce films of different thickness and so produce half-wave and quarter wave retardation films.

Usually, reactive mesogen layers require an alignment layer or rubbed plastic substrate to align in the planar state. In this regard, two main methods are currently used in the display industry to align liquid crystals for optical film applications:

(i) Rubbing process, wherein a plastic substrate or alignment layer is rubbed in one direction providing alignment direction for coated liquid crystals. The alignment quality varies depending on the rubbing process and the properties of the substrate or film. The rubbing process is difficult to optimize and can produce variable results. Furthermore, the rubbing process is considered an unfavorable process by LCD producers because it can produce particles that are difficult to control in high-class clean rooms.

(ii) Photoalignment process, as described in U.S. Pat. No. 7,364,671 B2, wherein a dichroic photoinitiator is photo-oriented while maintaining conditions that the polymerisation or cross-linking of the polymerisable liquid-crystalline material is essentially inhibited. The photoalignment and polymerisation step are carried out in two different steps and under different conditions. Accordingly, such photoaligning layers can be difficult to prepare due to the requirements that the production conditions have to be adjusted concerning the individual composition of various liquid-crystalline materials. In addition, an annealing step is usually required to allow liquid crystals to align fully. Consequently, photoaligning layers following this process are expensive.

Therefore, there is still the need for alternative production methods, which do not have the drawbacks of prior art methods or have them to a less extent.

One aim of the present invention is to provide a one-step method of production for optical compensators, which
a) is in particular suitable for mass production,
b) is applicable for a broad range of polymerisable liquid-crystalline materials,
c) does not require an alignment layer like e.g. rubbed polyimide layer,
d) allows patterning of polymer films,
e) allows overcoating a chosen layer without the need for an extra alignment layer, and
f) allows producing thick films with a uniform alignment.

Other aims of the present invention are immediately evident to the person skilled in the art from the following detailed description.

Surprisingly, the inventors have found that the above-described problems can be solved by the present invention, which removes the need for an alignment layer or rubbing process to provide liquid crystal alignment for planar aligned optical films, and which provides a way of producing planar or tilted aligned film without the need for an alignment layer and/or rubbing.

The polymer films can be created from reactive mesogens coated in the isotropic phase. A polarisation state sensitive photoinitiator is required in combination with UV polarised light and heat to induce planar or tilted alignment in the resultant optical film. The process of making such a film can be completed in one step using heat and polarised UV light. As such, they can be coated on many different substrates (e.g. plain glass, colour filters, plastic substrates) without further treatment, producing e.g. planar A-type retarder films or tilted O-type retarder films.

SUMMARY OF THE INVENTION

The invention relates to a method of preparing a polymer film comprising, preferably consisting of, the following steps:
a) providing a layer of a polymerisable liquid-crystalline material comprising at least one dichroic photoinitiator onto a substrate,
b) irradiating the liquid-crystalline material in its isotropic phase with linear polarised light, and c) optionally, removing the polymerised film from the substrate.

The invention further relates to a polymer film obtainable from a method as described above and below.

The invention further relates to the use of polymer film as described above and below in liquid crystal displays (LCDs) or other optical or electro-optical devices, for decorative or security applications, as alignment layer or optical retardation film.

Said optical and electro-optical devices include, without limitation electro-optical displays, liquid crystal displays (LCDs), polarisers, compensators, beam splitters, reflective films, alignment films, colour filters, holographic elements, hot stamping foils, coloured images, decorative or security markings, liquid-crystalline pigments, adhesive layers, non-linear optic (NLO) devices, and optical information storage devices.

The invention further relates to a compensator comprising at least one polymer film as described above and below.

The invention further relates to an LCD comprising at least one polymer film as described above and below.

TERMS AND DEFINITIONS

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

The term "polymerisation" means the chemical process to form a polymer by bonding together multiple polymerisable groups or polymer precursors (polymerizable compounds) containing such polymerisable groups.

The terms "film" and "layer" include rigid or flexible, self-supporting or free-standing films with mechanical stability, as well as coatings or layers on a supporting substrate or between two substrates.

The term "liquid crystal (LC)" relates to materials having liquid crystalline mesophases in some temperature ranges (thermotropic LCs) or in some concentration ranges in solutions (lyotropic LCs). They obligatorily contain mesogenic compounds.

The terms "mesogenic compound" and "liquid crystal compound" mean a compound comprising one or more calamitic (rod- or board/lath-shaped) or discotic (disk-shaped) mesogenic groups. The term "mesogenic group" means a group with the ability to induce liquid crystalline phase (or mesophase) behaviour.

The compounds comprising mesogenic groups do not necessarily have to exhibit a liquid-crystalline mesophase themselves. It is also possible that they show liquid-crystalline mesophases only in mixtures with other compounds, or when the mesogenic compounds or materials, or the mixtures thereof, are polymerised. This includes low-molecular-weight non-reactive liquid-crystalline compounds, reactive or polymerisable liquid-crystalline compounds, and liquid-crystalline polymers.

A calamitic mesogenic group usually comprises a mesogenic core consisting of one or more aromatic or non-aromatic cyclic groups connected to each other directly or via linkage groups, optionally comprising terminal groups attached to the ends of the mesogenic core, and optionally comprises one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" means a polymerisable mesogenic or liquid crystal compound, preferably a monomeric compound. These compounds can be used as pure compounds or as mixtures of reactive mesogens with other compounds functioning as photoinitiators, inhibitors, surfactants, stabilizers, chain transfer agents, non-polymerisable compounds, etc.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive or non-polymerisable" compounds.

The term "chiral" in general is used to describe an object that is non-superimposable on its mirror image. "Achiral" (non-chiral) objects are objects that are identical to their mirror image.

The pitch induced by the chiral substance ($P_0$) is in a first approximation inversely proportional to the concentration (c) of the chiral material used. The pitch induced by the chiral substance ($P_0$) is in a first approximation inversely proportional to the concentration (c) of the chiral material used. The constant of proportionality of this relation is called the helical twisting power (HTP) of the chiral substance and is defined by equation (1).

$$HTP=1/(c \cdot P_0) \tag{1}$$

As with the common photoinitiators, a "dichroic photoinitiator" dissociates when exposed to the correct wavelength and the formed radicals will initiate polymerisation of monomers. The dichroic photoinitiator has the property that the light absorption is dependent on the molecular orientation of the molecule. The dichroic photoinitiators selectively dissociate when aligned with the electric field vector of the incoming light.

Light in the form of a plane wave in space is said to be linearly polarized. Visible light is electromagnetic radiation that has wavelength in a range from about 400 nm to about 740 nm. Ultraviolet (UV) light is electromagnetic radiation with a wavelength in a range from about 200 nm to 450 nm.

The Irradiance ($E_e$) or radiation power is defined as the power of electromagnetic radiation ($d\theta$) per unit area (dA) incident on a surface:

$$E_e = d\theta/dA. \tag{2}$$

The radiant exposure or radiation dose ($H_e$), is as the irradiance or radiation power ($E_e$) per time (t):

$$H_e = E_e \cdot t. \tag{3}$$

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees. The term "clearing point" means the temperature at which the transition between the mesophase with the highest temperature range and the isotropic phase occurs.

The term "director" is known in prior art and means the preferred orientation direction of the long molecular axes (in case of calamitic compounds) or short molecular axes (in case of discotic compounds) of the liquid-crystalline or RM molecules. In case of uniaxial ordering of such anisotropic molecules, the director is the axis of anisotropy.

The term "alignment" or "orientation" relates to alignment (orientational ordering) of anisotropic units of material such as small molecules or fragments of big molecules in a common direction named "alignment direction". In an aligned layer of liquid-crystalline or RM material the liquid-crystalline director coincides with the alignment direction so that the alignment direction corresponds to the direction of the anisotropy axis of the material.

The terms "uniform orientation" or "uniform alignment" of an liquid-crystalline or RM material, for example in a layer of the material, mean that the long molecular axes (in case of calamitic compounds) or the short molecular axes (in case of discotic compounds) of the liquid-crystalline or RM molecules are oriented substantially in the same direction. In other words, the lines of liquid-crystalline director are parallel.

Throughout this application, the alignment of liquid-crystalline or RM layers, unless stated otherwise, is uniform alignment.

The term "planar orientation/alignment", for example in a layer of an liquid-crystalline or RM material, means that the long molecular axes (in case of calamitic compounds) or the short molecular axes (in case of discotic compounds) of the liquid-crystalline or RM molecules are oriented substantially parallel to the plane of the layer.

The term "tilted orientation/alignment", for example in a layer of an liquid-crystalline or RM material, means that the long molecular axes (in case of calamitic compounds) or the short molecular axes (in case of discotic compounds) of the liquid-crystalline or RM molecules are oriented at an angle θ ("tilt angle") between 0 and 90° relative to the plane of the layer.

The term "A plate/film" means an optical retarder utilizing a layer of uniaxially birefringent material with its extraordinary axis oriented parallel to the plane of the layer.

The term "O plate/film" means an optical retarder utilizing a layer of uniaxially birefringent material with its extraordinary axis tilted at an angle to the plane of the layer.

The birefringence Δn is defined as follows $$\Delta n = n_e - n_o \quad (4)$$

wherein $n_e$ is the extraordinary refractive index and $n_o$ is the ordinary refractive index, and the average refractive index $n_{av.}$ is given by the following equation:

$$n_{av.} = ((2n_o^2 + n_e^2)/3)^{1/2} \quad (5)$$

The average refractive index $n_{av.}$ and the ordinary refractive index $n_o$ can be measured using an Abbe refractometer. Δn can then be calculated from the above equations.

In case of doubt the definitions as given in C. Tschierske, G. Pelzl and S. Diele, Angew. Chem. 2004, 116, 6340-6368 shall apply.

DETAILED DESCRIPTION

Figure 1:
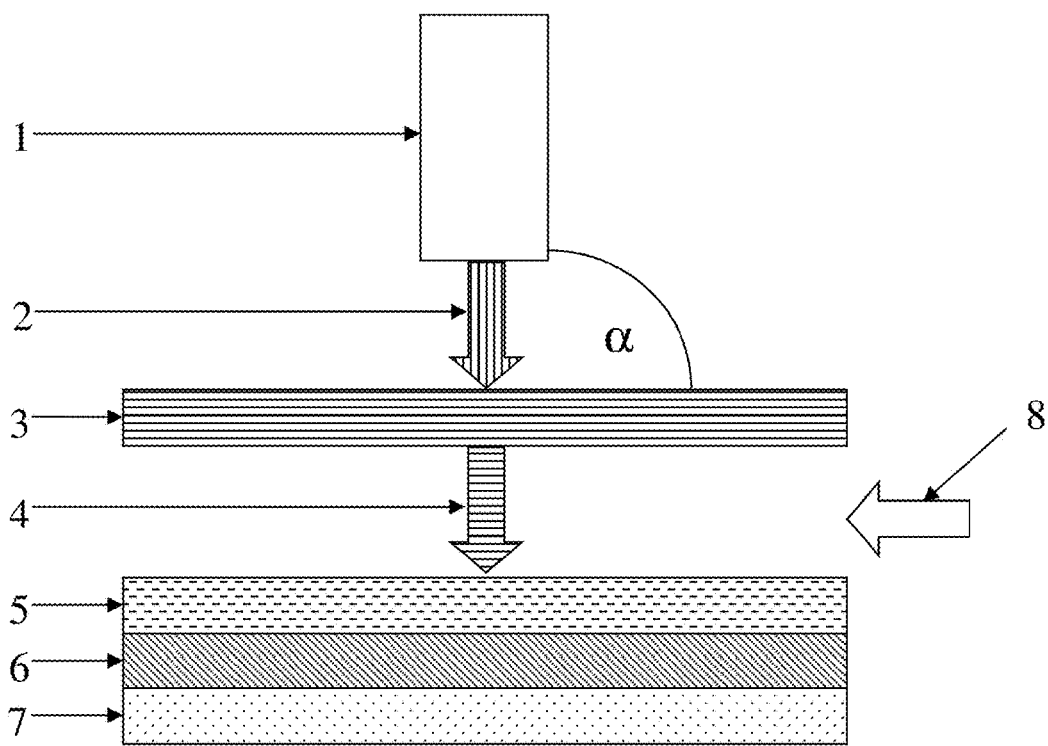
FIG. 1 schematically illustrates the process according to the present invention, wherein 1 denotes the radiation source, 2 denotes the unpolarized light, 3 denotes the wire grid polarizer, 4 denotes linear polarized light, 5 denotes the polymerisable liquid-crystalline material, 6 denotes the substrate, 7 denotes a heating source, 8 denotes a heated nitrogen purge and α denotes the variable radiation angle.

A suitable polymerisable liquid-crystalline material used for the method according to the present invention comprises at least one mono-, di- or multireactive polymerisable mesogenic compound and at least one dichroic photoinitiator.

All known dichroic photoinitiators are suitable for the method according to the present invention. Preferably dichroic photoinitiators comprising a α-amino group as disclosed in EP-A-1 388 538 are used. Especially preferred are dichroic photoinitiators of formula I,

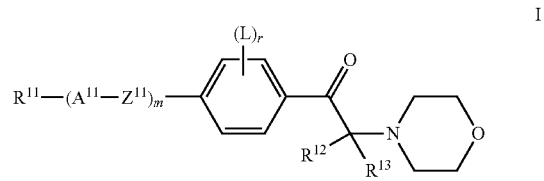

wherein,
P is a polymerisable group,
Sp is a spacer group or a single bond,
$A^{11}$ is in case of multiple occurrence independently of one another an aryl-, heteroaryl-, aliphatic or heterocyclic group optionally being substituted by one or more identical or different groups L, preferably 1,4-cyclohexylene or 1,4-phenylene optionally being substituted by one or more identical or different groups L,
$Z^{11}$ is in each occurrence independently from each other, —O—, —S—, —CO—, —COO—, —OCO—, —S—CO—, —CO—S—, —O—COO—, —CO—NR$^{01}$—, —NR$^{01}$—CO—, —NR$^{01}$—CO—NR$^{02}$, —NR$^{01}$—CO—O—, —O—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—CH=CH—, or a single bond, preferably —COO—, —OCO— or a single bond,
$Y^{01}$ and $Y^{02}$ each, independently of one another, denote H, F, Cl or CN.
m is 0, 1, 2 or 3, preferably 2 or 3,
r is 0, 1, 2, 3 or 4, preferably 0, 1, or 2,
L is, in case of multiple occurrence independently of one another, H, halogen, CN or optionally halogenated alkyl, alkoxy, alkylcarbonyl, alkoxycarbonyl, alkylcarbonyloxy or alkoxycarbonyloxy with 1 to 5 C atoms, preferably H, halogen or CN, alkyl or alkoxy with 1 to 5 C atoms,
$R^{11-13}$ are independently of each other H, halogen, CN, NO$_2$, NCS, SF$_5$, P-Sp- or straight chain or branched alkyl with 1 to 20 C-atoms that is optionally mono- or polysubstituted by F, Cl, Br, I or CN, and wherein one or more non-adjacent $CH_2$ groups are optionally replaced, in each case independently from one another, by —O—, —S—, —$NR^{01}$—, —$SiR^{01}R^{02}$—, —CO—, —COO—, —OCO—, —OCO—O—, —$NR^{01}$—CO—, —CO—$NR^{01}$—, —$NR^{01}$—CO—$NR^{02}$—, —S—CO—, —CO—S—, —$CY^{01}$=$CY^{02}$— or —C≡C— in such a manner that O and/or S atoms are not linked directly to one another, preferably alkyl or alkoxy with 1 to 12 C-atoms, and $R^{01}$ and $R^{02}$ are in dependently of each other H, or straight chain or branched alkyl with 1 to 20 C-atoms, preferably 1 to 6 C— atoms.

Above and below, "carbyl group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). "Hydrocarbyl group" denotes a carbyl group, which additionally contains one or more H atoms and optionally one or more heteroatoms, such as, for example, N, O, S, P, Si, Se, As, Te or Ge. "Halogen" denotes F, Cl, Br or I.

A carbyl or hydrocarbyl group can be a saturated or unsaturated group. Unsaturated groups are, for example, aryl, alkenyl or alkinyl groups. A carbyl or hydrocarbyl group having more than 3 C atoms can be straight-chain, branched and/or cyclic and may also contain spiro links or condensed rings.

Above and below, the terms "alkyl", "aryl", "heteroaryl", etc., also encompass polyvalent groups, for example alkylene, arylene, heteroarylene, etc. The term "aryl" denotes an aromatic carbon group or a group derived therefrom. The term "heteroaryl" denotes "aryl" in accordance with the above definition containing one or more heteroatoms.

Preferred carbyl and hydrocarbyl groups are optionally substituted alkyl, alkenyl, alkinyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms. Further preferred carbyl and hydrocarbyl groups are $C_1$-$C_{40}$ alkyl, $C_2$-$C_{40}$ alkenyl, $C_2$-$C_{40}$ alkinyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkinyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbyl and hydrocarbyl groups are straight-chain, branched or cyclic alkyl radicals having 1 to 40, preferably 1 to 25 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoro-methyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkinyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 2 to 25 C atoms and mono-, bi- or tricyclic heteroaryl groups having 6 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, iso-indole, indolizine, indazole, benzimidazole, benzotriazole, purine, naphth-imidazole, phenanthrimidazole, pyridimidazole, pyrazinimidazole, quinoxa-linimidazole, benzoxazole, naphthoxazole, anthroxazole, phenanthroxa-zole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenan-throline, thieno[2,3b]thiophene, thieno[3,2b] thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those which contain exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbyl and hydrocarbyl radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, OH, —ON, —$NO_2$, —NCO, —NOS, —OCN, —SCN, —C(=O)N($R^x$)$_2$, —C(=O)$Y^1$, —C(=O)$R^x$, —C(=O)O$R^x$, —N($R^x$)$_2$, in which $R^x$ has the above-mentioned meaning, and $Y^1$ denotes halogen, optionally substituted silyl, optionally substituted aryl or heteroaryl having 4 to 40, preferably 4 to 20 ring atoms, and straight-chain or branched alkyl, alkenyl, alkinyl, alkoxy, alkyl carbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^0$, —O$R^0$, —CO—$R^0$, —CO—O—$R^0$, —O—CO—$R^0$ or —O—CO—O—$R^0$, in which $R^0$ has the above-mentioned meaning.

Particularly preferred substituents L are, for example, F, Cl, ON, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

In the formula shown above and below, a substituted phenylene ring

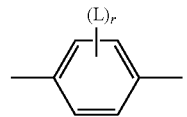

is preferably

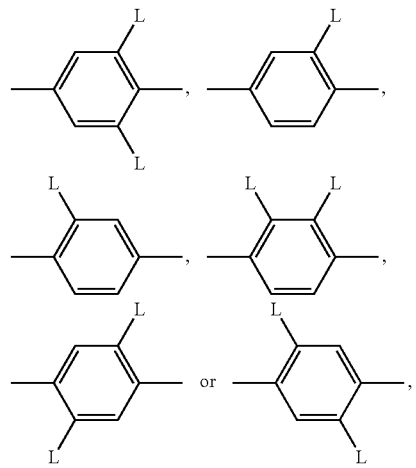

in which L has, on each occurrence identically or differently, one of the meanings given above and below, and is preferably F, Cl, ON, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, ON, $CH_3$, $C_2H_5$, $OCH_3$, $COCH_3$, $OCF_3$ or P-Sp-, most preferably F, Cl, $CH_3$, $OCH_3$, $COCH_3$ or $OCF_3$.

The polymerisable group P is preferably selected from groups containing a C=C double bond or C≡C triple bond, and groups, which are suitable for polymerisation with ring opening, such as, for example, oxetane or epoxide groups.

Very preferably, the polymerisable group P is selected from the group consisting of $CH_2$=$CW^1$—COO—, $CH_2$=$CW^1$—CO—,

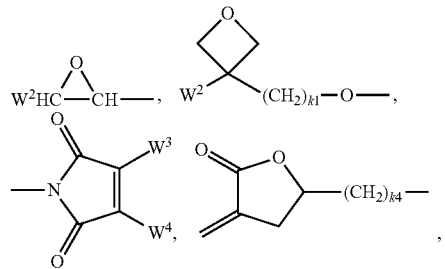

$CH_2$=$CW^2$—(O)$_{k3}$—, $CW^1$=CH—CO—(O)$_{k3}$—, $CW^1$=CH—CO—NH—, $CH_2$=$CW^1$—CO—NH—, $CH_3$—CH=CH—O—, $(CH_2$=CH$)_2$CH—OCO—, $(CH_2$=CH—$CH_2)_2$CH—OCO—, $(CH_2$=CH$)_2$CH—O—, $(CH_2$=CH—$CH_2)_2$N—, $(CH_2$=CH—$CH_2)_2$N—CO—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, in which $W^1$ denotes H, F, Cl, CN, $CF_3$, phenyl or alkyl having 1 to 5 C atoms, in particular H, F, $C_1$ or $CH_3$, W² denotes H or alkyl having 1 to 5 C atoms, in particular H, methyl, ethyl or n-propyl, W³ and W⁴ each, independently of one another, denote H, Cl or alkyl having 1 to 5 C atoms, Phe denotes 1,4-phenylene, which is optionally substituted by one or more radicals L as being defined above but being different from P-Sp, and $k_1$, $k_2$ and $k_3$ each, independently of one another, denote 0 or 1, $k_3$ preferably denotes 1, and $k_4$ is an integer from 1 to 10.

Particularly preferred groups P are CH₂=CH—COO—, CH₂=C(CH₃)—COO—, CH₂=CF—COO—, CH₂=CH—, CH₂=CH—O—, (CH₂=CH)₂CH—OCO—, (CH₂=CH)₂CH—O—,

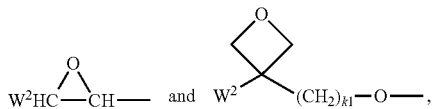

in particular vinyloxy, acrylate, methacrylate, fluoroacrylate, chloroacrylate, oxetane and epoxide, most preferably acrylate or methacrylate.

In a further preferred embodiment of the invention, all polymerisable compounds and corresponding sub-formulae thereof contain, instead of one or more radicals P-Sp-, one or more branched radicals containing two or more polymerisable groups P (multireactive polymerisable radicals). Suitable radicals of this type, and polymerisable compounds containing them, are described, for example, in U.S. Pat. No. 7,060,200 B1 or US 2006/0172090 A1. Particular preference is given to multireactive polymerisable radicals selected from the following formulae:

| | |
|---|---|
| —X-alkyl-CHP¹—CH₂—CH₂P² | I*a |
| —X-alkyl-C(CH₂P¹)(CH₂P²)—CH₂P³ | I*b |
| —X-alkyl-CHP¹CHP²—CH₂P³ | I*c |
| —X-alkyl-C(CH₂P¹)(CH₂P²)—$C_{aa}H_{2aa+1}$ | I*d |
| —X-alkyl-CHP¹—CH₂P² | I*e |
| —X-alkyl-CHP¹P² | I*f |
| X-alkyl-CP¹P²—$C_{aa}H_{2aa+1}$ | I*g |
| —X-alkyl-C(CH₂P¹)(CH₂P²)—CH₂OCH₂—C(CH₂P³)(CH₂P⁴)CH₂P⁵ | I*h |
| —X-alkyl-CH((CH₂)$_{aa}$P¹)((CH₂)$_{bb}$P²) | I*i |
| —X-alkyl-CHP¹CHP²—$C_{aa}H_{2aa+1}$ | I*k | in which
alkyl denotes a single bond or straight-chain or branched alkylene having 1 to 12 C atoms, in which one or more non-adjacent CH₂ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where R$^x$ has the above-mentioned meaning and preferably denotes R⁰ as defined above,
aa and bb each, independently of one another, denote 0, 1, 2, 3, 4, 5 or 6,
X has one of the meanings indicated for X', and P$^{1-5}$ each, independently of one another, have one of the meanings indicated above for P.

Preferred spacer groups Sp are selected from the formula Sp'-X'-, so that the radical "P-Sp-" conforms to the formula "P-Sp'-X'—", where
Sp' denotes alkylene having 1 to 20, preferably 1 to 12 C atoms, which is optionally mono- or polysubstituted by F, Cl, Br, I or CN and in which, in addition, one or more non-adjacent CH₂ groups may each be replaced, independently of one another, by —O—, —S—, —NH—, —NR⁰¹—, —SiR⁰¹R⁰²—, —CO—, —COO—, —OCO—, —OCO—O—, —S—CO—, —CO—S—, —NR⁰¹—CO—O—, —O—CO—NR⁰¹—, —NR⁰¹—CO—NR⁰¹—, —CH=CH— or —C≡C— in such a way that O and/or S atoms are not linked directly to one another,
X' denotes —O—, —S—, —CO—, —COO—, —OCO—, —O—COO—, —CO—NR⁰¹—, —NR⁰¹—CO—, —NR⁰¹—CO—NR⁰¹—, —OCH₂—, —CH₂O—, —SCH₂—, —CH₂S—, —CF₂O—, —OCF₂—, —CF₂S—, —SCF₂—, —CF₂CH₂—, —CH₂CF₂—, —CF₂CF₂—, —CH=N—, —N=CH—, —N=N—, —CH=CR⁰¹—, —CY⁰¹=CY⁰²—, —C≡C—, —CH=CH—COO—, —OCO—CH=CH— or a single bond,
R⁰¹ and R⁰² each, independently of one another, denote H or alkyl having 1 to 12 C atoms, and
Y⁰¹ and Y⁰² each, independently of one another, denote H, F, Cl or CN.
X' is preferably —O—, —S—, —CO—, —COO—, —OCO—, —O—COO—, —CO—NR⁰—, —NR⁰¹—CO—, —NR⁰¹—CO—NR⁰¹— or a single bond.

Typical spacer groups Sp' are, for example, —(CH₂)$_{p1}$—, —(CH₂CH₂O)$_{q1}$—CH₂CH₂—, —CH₂CH₂—S—CH₂CH₂—, —CH₂CH₂—NH—CH₂CH₂— or —(SiR⁰¹R⁰²—O)$_{p1}$—, in which p1 is an integer from 1 to 12, q1 is an integer from 1 to 3, and R⁰¹ and R⁰² have the above-mentioned meanings.

Particularly preferred groups —X'-Sp'- are —(CH₂)$_{p1}$—, —O—(CH₂)$_{1p}$—, —OCO—(CH₂)$_{p1}$—, —OCOO—(CH₂)$_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethyl-ene-N-methyliminoethylene, 1-methylalkylene, ethenylene, propenylene and butenylene.

Compounds of formula I, which preferably can be used for the method according to the present invention, are the following

I-1

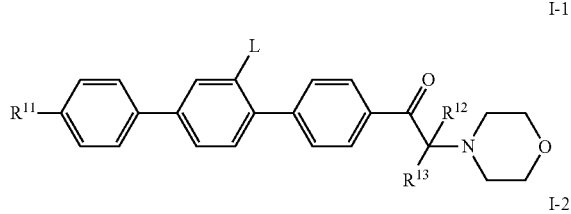

I-2

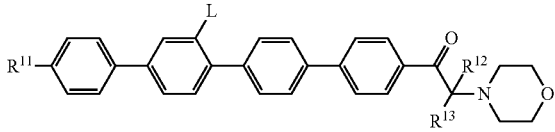

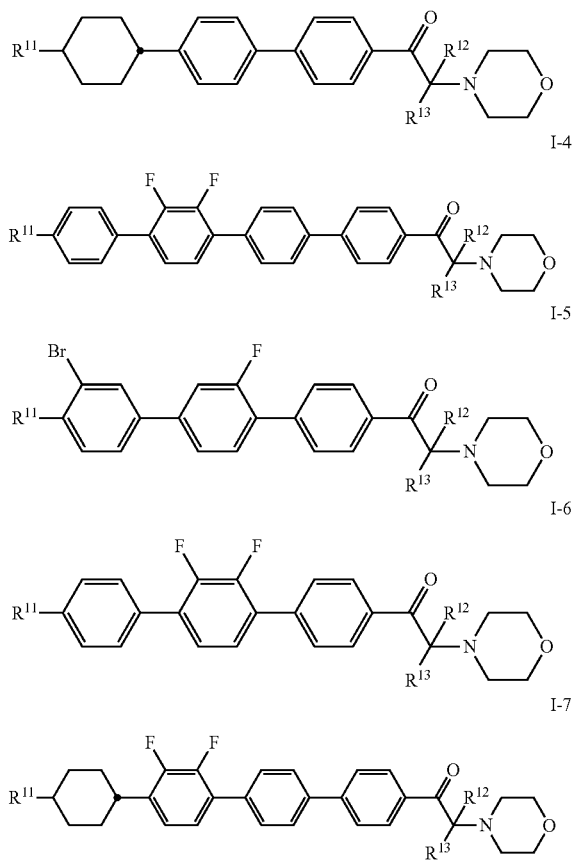

wherein L is H or F, $R^{11}$ is alkyl or alkoxy with 1 to 12 C-atoms, $R^{12}$ and $R^{13}$ are selected from alkyl or alkoxy with 1 to 6 C-atoms, very preferably from methyl, ethyl or propyl.

Most preferred dichroic photoinitiators used for the method according to the present invention are compounds of the formula I-2 wherein L is F, $R^{11}$ is alkyl 1 to 12 C-atoms, $R^{12}$ and $R^{13}$ are selected from alkyl, very preferably from methyl, ethyl or propyl.

The proportion of the dichroic photoinitiator in a preferred liquid-crystalline material used for the method according to the present invention is preferably in the range from 1 to 40% by weight, more preferably in the range from 1 to 30% by weight and even more preferably in the range from 1 to 20% by weight.

Preferably, the polymerisable liquid-crystalline material used for the method according to the present invention is a mixture of two or more, for example 2 to 25 liquid-crystalline compounds.

The method according to the present invention is not limited to specific liquid-crystalline materials, but can in principle be used for alignment of all RMs known from prior art. The RMs are preferably selected from calamitic or discotic compounds demonstrating thermotropic or lyotropic liquid crystallinity, very preferably calamitic compounds, or mixtures of one or more types of these compounds having liquid-crystalline mesophases in a certain temperature range. These materials typically have good optical properties, like reduced chromaticity, and can be easily and quickly aligned into the desired orientation, which is especially important for the industrial production of polymer films at large scale. The liquid crystals can be small molecules (i.e. monomeric compounds) or liquid-crystalline oligomers.

Preferably, the polymerisable liquid-crystalline material used for the method according to the present invention comprise preferably at least one monoreactive polymerisable mesogenic compounds, at least one di- or multireactive polymerisable mesogenic compounds, and at least one dichroic photoinitiator.

Suitable polymerisable liquid-crystalline material in accordance with the present invention comprise polymerisable mono-, di- or multireactive compounds selected of formula II P-Sp-MG-R⁰      II wherein
P is a polymerisable group, preferably an acryl, methacryl, vinyl, vinyloxy, propenyl ether, epoxy, oxetane or styrene group,
Sp is a spacer group or a single bond,
MG is a rod-shaped mesogenic group, which is preferably selected of formula M,
M is $-(A^{21}-Z^{21})_k-A^{22}-(Z^{22}-A^{23})_l-$,
$A^{21}$ to $A^{23}$ are in each occurrence independently of one another an aryl-, heteroaryl-, heterocyclic- or alicyclic group optionally being substituted by one or more identical or different groups L, preferably 1,4-cyclohexylene or 1,4-phenylene, 1,4 pyridine, 1,4-pyrimidine, 2,5-thiophene, 2,6-dithieno[3,2-b:2',3'-d]thiophene, 2,7-fluorine, 2,6-naphtalene, 2,7-phenanthrene optionally being substituted by one or more identical or different groups L,
$Z^{21}$ and $Z^{22}$ are in each occurrence independently from each other, —O—, —S—, —CO—, —COO—, —OCO—, —S—CO—, —CO—S—, —O—COO—, —CO—NR$^{O1}$, —NR$^{O1}$—CO—, —NR$^{O1}$—CO—NR$^{O2}$, —NR$^{O1}$—CO—O—, —O—CO—NR$^{O1}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{O1}$—, —CY$^{O1}$=CY$^{O2}$—, —C≡C—, —CH=CH—COO—, —OCO—CH=CH—, or a single bond, preferably —COO—, —OCO—, —CO—O—, —O—CO—, —OCH$_2$—, —CH$_2$O—, —, —CH$_2$CH$_2$—, —(CH$_2$)$_4$—, —CF$_2$CH$_2$—, —CH$_2$CF$_2$—, —CF$_2$CF$_2$—, —C≡C—, —CH=CH—COO—, —OCO—CH=CH—, or a single bond,
L has one of the meanings as defined above in formula I,
R⁰ is H, alkyl, alkoxy, thioalkyl, alkylcarbonyl, alkoxycarbonyl, alkylcarbonyloxy or alkoxycarbonyloxy with 1 to 20 C atoms more, preferably 1 to 15 C atoms which are optionally fluorinated, or is Y⁰ or P-Sp-,
Y⁰ is F, Cl, CN, NO$_2$, OCH$_3$, OCN, SCN, optionally fluorinated alkylcarbonyl, alkoxycarbonyl, alkylcarbonyloxy or alkoxycarbonyloxy with 1 to 4 C atoms, or mono-oligo- or polyfluorinated alkyl or alkoxy with 1 to 4 C atoms, preferably F, Cl, CN, NO$_2$, OCH$_3$, or mono-oligo- or polyfluorinated alkyl or alkoxy with 1 to 4 C atoms
$Y^{O1}$ and $Y^{O2}$ have each and independently the meaning as defined above in formula I,
$R^{O1}$ and $R^{O2}$ have each and independently the meaning as defined above in formula I, and
k and l are each and independently 0, 1, 2, 3 or 4, preferably 0, 1 or 2, most preferably 1.

Suitable RMs are known to the skilled person and are disclosed for example in WO 93/22397, EP 0 261 712, DE 195 04 224, WO 95/22586, WO 97/00600, U.S. Pat. No. 5,518,652, U.S. Pat. No. 5,750,051, U.S. Pat. No. 5,770,107 and U.S. Pat. No. 6,514,578. Examples of suitable and preferred monoreactive, direactive or multireactive RMs, used in accordance with the present invention, are shown in the following list.
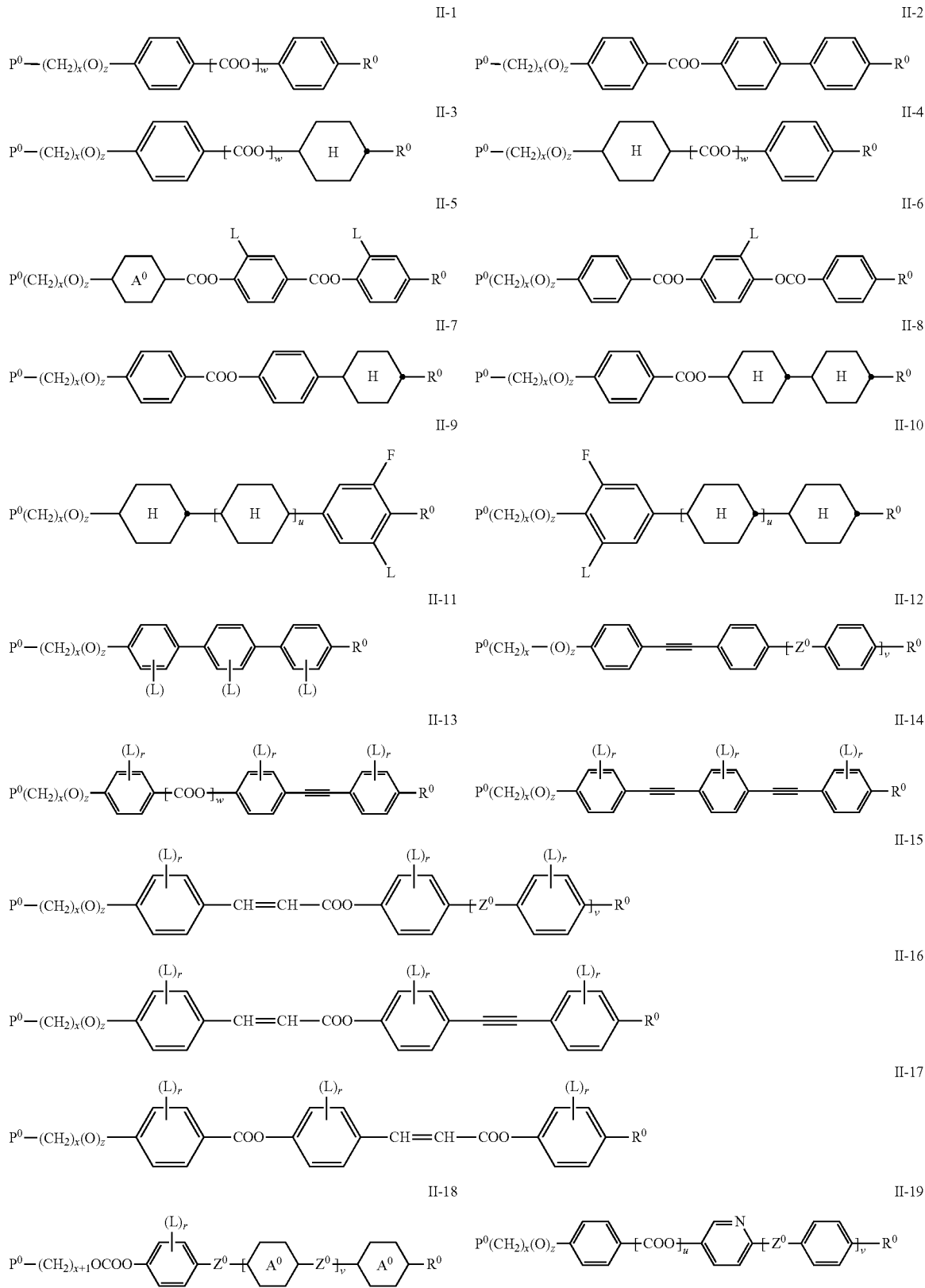

-continued
II-20
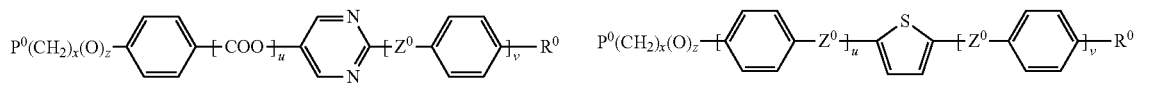
II-21
II-22
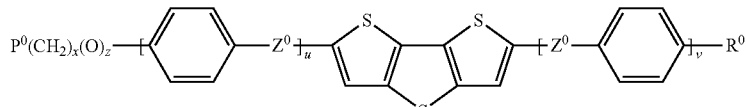
II-23
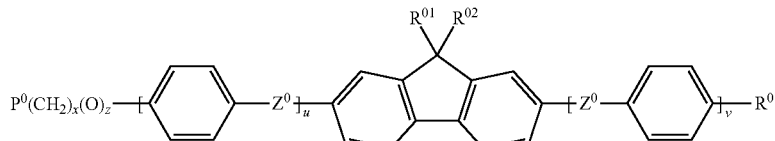
II-24
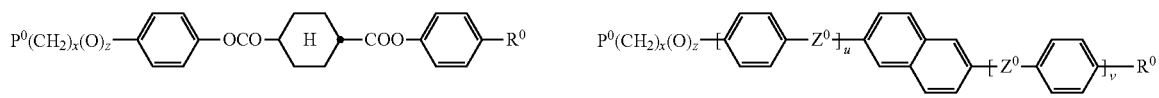
II-25
II-26
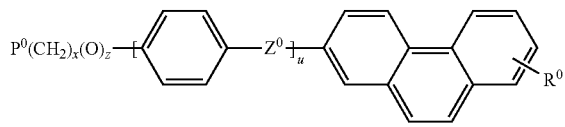
II-27
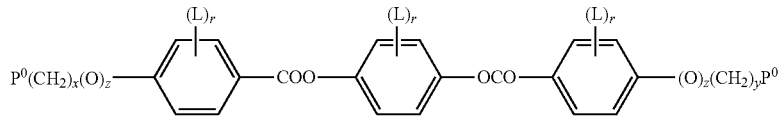
II-28
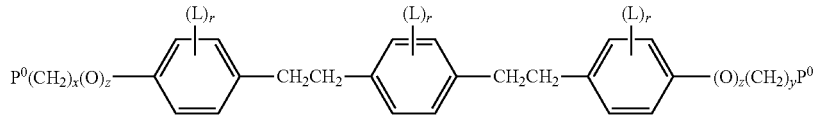
II-29
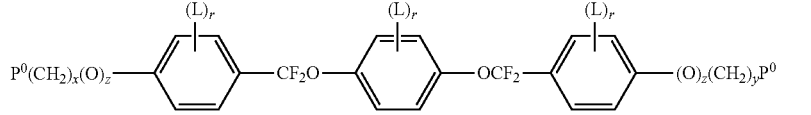
II-30
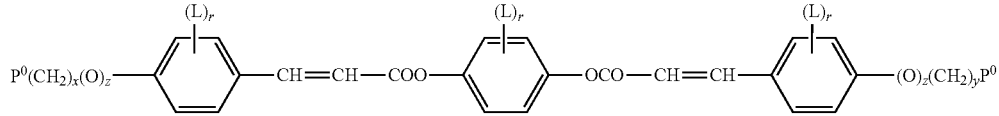
II-31
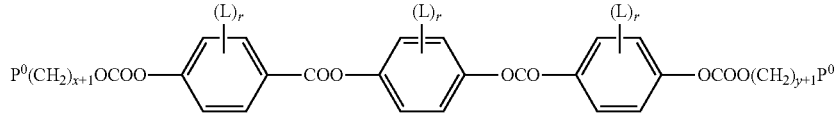
II-32
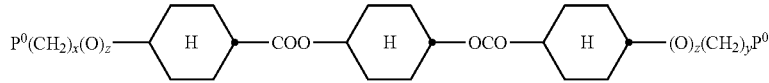
II-33
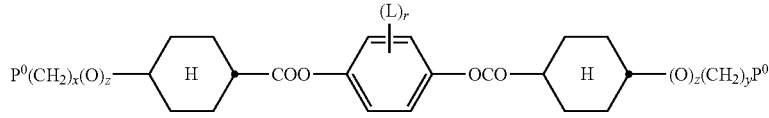

-continued

II-34

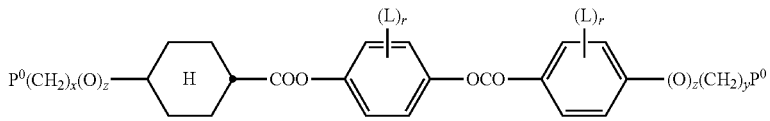

wherein
$P^0$ is, in case of multiple occurrence independently of one another, a polymerisable group, preferably an acryl, methacryl, oxetane, epoxy, vinyl, vinyloxy, propenyl ether or styrene group,
$A^0$ is, in case of multiple occurrence independently of one another, 1,4-phenylene that is optionally substituted with 1, 2, 3 or 4 groups L, or trans-1,4-cyclohexylene,
$Z^0$ is, in case of multiple occurrence independently of one another, —COO—, —OCO—, —CH$_2$CH$_2$—, —C≡C—, —CH=CH—, —CH=CH—COO—, —OCO—CH=CH— or a single bond,
r is 0, 1, 2, 3 or 4, preferably 0, 1 or 2,
t is, in case of multiple occurrence independently of one another, 0, 1, 2 or 3,
u and v are independently of each other 0, 1 or 2,
w is 0 or 1,
x and y are independently of each other 0 or identical or different integers from 1 to 12,
z is 0 or 1, with z being 0 if the adjacent x or y is 0,
and wherein the benzene and naphthalene rings can additionally be substituted with one or more identical or different groups L.
The parameter $R^0$, $Y^0$, $R^{01}$, $R^{02}$ and L have the same meanings as given above in formula II.
In another preferred embodiment, a suitable polymerisable liquid-crystalline material comprises at least one monoreactive chiral polymerisable mesogenic compounds, at least one mono-, di- or multireactive achiral polymerisable mesogenic compounds, and at least one dichroic photoinitiator.

In an especially preferred embodiment, a suitable polymerisable liquid-crystalline material used for the method of the present invention comprises at least one di- or multireactive chiral polymerisable mesogenic compounds, at least one mono-, di- or multireactive achiral polymerisable mesogenic compounds, and at least one dichroic photoinitiator.

The mono-, di- or multireactive chiral polymerisable mesogenic compounds used according to the present invention, preferably comprise one or more ring elements, linked together by a direct bond or via a linking group and, where two of these ring elements optionally may be linked to each other, either directly or via a linking group, which may be identical to or different from the linking group mentioned. The ring elements are preferably selected from the group of four-, five-, six- or seven-, preferably of five- or six-, membered rings.

Preferably used polymerisable chiral compounds according to the instant invention, preferably have, each alone or in combination with each other, an absolute value of the helical twisting power (IHTP$_{total}$I) of 20 µm$^{-1}$ or more, preferably of 40 µm$^{-1}$ or more, more preferably in the range of 60 µm$^{-1}$ or more, most preferably in the range of 80 µm$^{-1}$ or more to 260 µm$^{-1}$ or less.

Suitable polymerisable chiral compounds and their synthesis are e.g. described in U.S. Pat. No. 7,223,450 or commercially available like Paliocolor LC756® (BASF AG).

Preferred mono-, di- or multireactive chiral polymerisable mesogenic compounds used according to the present invention the polymerisable are selected from the following formulae (CR1)

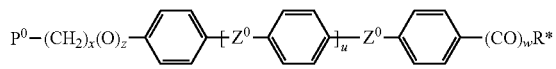

(CR2)

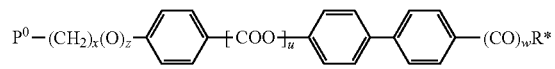

(CR3)

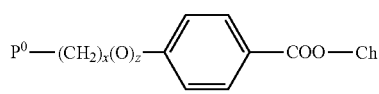

(CR4)

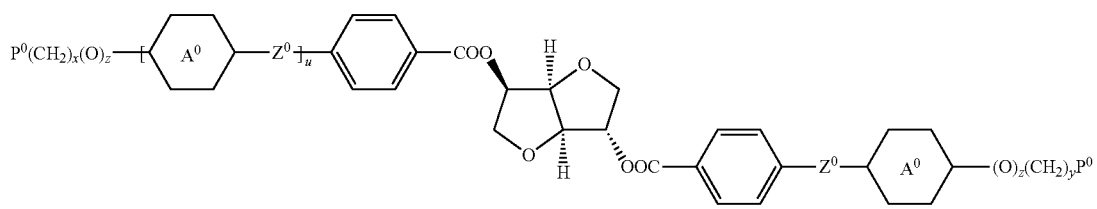

-continued

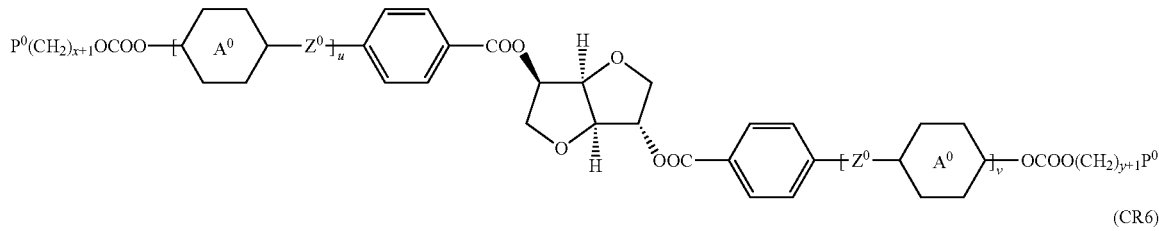

(CR5)

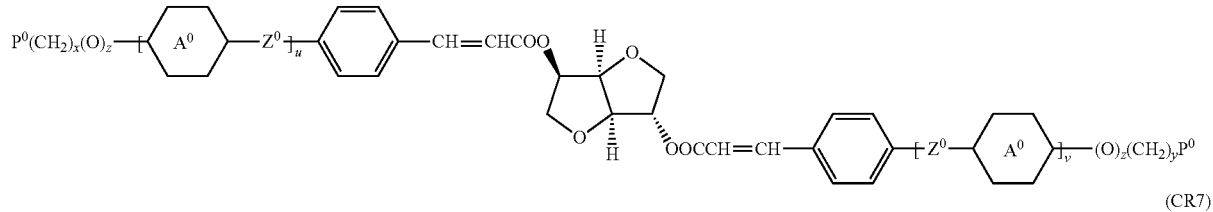

(CR6)

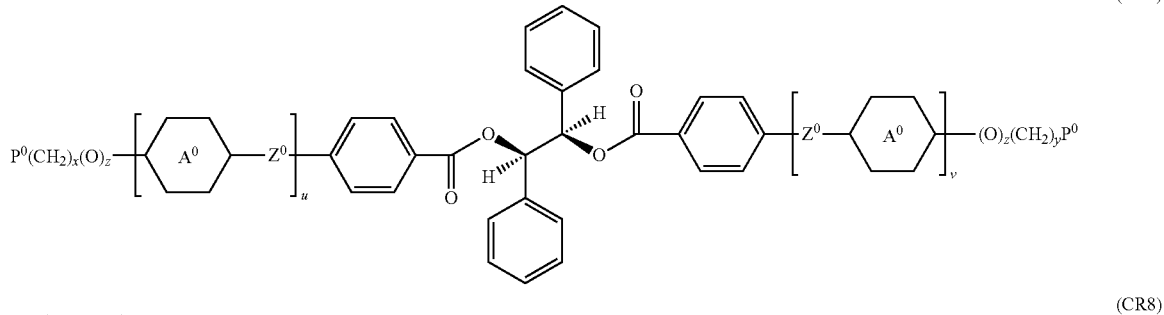

(CR7)

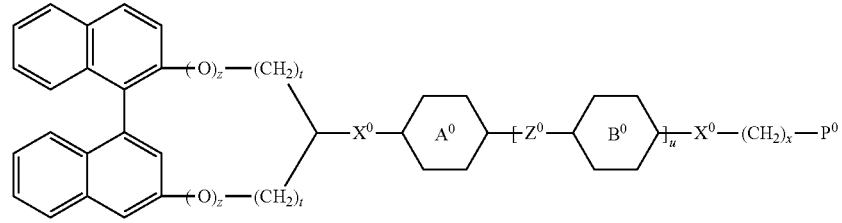

(CR8)

wherein

P⁰ is, in case of multiple occurrence independently of one another, a polymerisable group, preferably an acryl, methacryl, oxetane, epoxy, vinyl, vinyloxy, propenyl ether or styrene group, A⁰ and B⁰ are, in case of multiple occurrence independently of one another, 1,4-phenylene that is optionally substituted with 1, 2, 3 or 4 groups L, or trans-1,4-cyclohexylene, X⁰ and Z⁰ is, in case of multiple occurrence independently of one another, —COO—, —OCO—, —CH₂CH₂—, —C≡C—, —CH═CH—, —CH═CH—COO—, —OCO—CH═CH— or a single bond, R* is a chiral alkyl or alkoxy group with 4 or more, preferably 4 to 12 C atoms, like 2-methylbutyl, 2-methyloctyl, 2-methylbutoxy or 2-methyloctoxy, Ch is a chiral group selected from cholesteryl, estradiol, or terpenoid radicals like menthyl or citronellyl, L has one of the meaning as defined above in formula I, r is 0, 1, 2, 3 or 4, preferably 0, 1 or 2, t is, in case of multiple occurrence independently of one another, 0, 1, 2 or 3, u and v are independently of each other 0, 1 or 2, w is 0 or 1, x are independently of each other 0 or identical or different integers from 1 to 12, z is 0 or 1, with z being 0 if the adjacent x or y is 0, and wherein the benzene and naphthalene rings can additionally be substituted with one or more identical or different groups L.

In a preferred embodiment, the proportion of the monoreactive polymerisable mesogenic compounds, preferably selected from formulae II-1, II-13 in a liquid-crystalline material used for the method according to the present invention as a whole, is preferably in the range from 20 to 90% by weight, more preferably in the range from 30 to 80% by weight and even more preferably in the range from by weight 40 to 70%.

In another preferred embodiment, the proportion of the direactive polymerisable mesogenic compounds, preferably selected from formula II-27 in a liquid-crystalline material used for the method according to the present invention as a whole, is preferably in the range from 1 to 30% by weight, more preferably in the range from 1 to 20% by weight and even more preferably in the range from 1 to 10% by weight.

In another preferred embodiment, the proportion of the multireactive polymerisable mesogenic compounds in a liquid-crystalline material used for the method according to the present invention as a whole, is preferably in the range from 0 to 30% by weight, more preferably in the range from 0 to 20% by weight and even more preferably in the range from 0 to 10% by weight.

The proportion of chiral polymerisable mesogenic compounds, preferably selected from formula CR8 in a preferred liquid-crystalline material used for the method according to the present invention as a whole, is preferably in the range from 0 to 30% by weight, more preferably in the range from 0 to 20% by weight and even more preferably in the range from 0 to 10% by weight.

In a particularly preferred embodiment a polymerisable liquid-crystalline material used in accordance with the present invention, comprises at least one non-polymerisable chiral compound, at least one mono-, di- or multireactive achiral polymerisable mesogenic compound and at least one dichroic photoinitiator.

Especially preferred are non-polymerisable chiral compounds with a high helical twisting power (HTP), in particular those disclosed in WO 98/00428. Further typically used non-polymerisable chiral compounds are e.g. the commercially available R/S-5011, R-811 or CB-15 (from Merck KGaA, Darmstadt, Germany).

The proportion of said chiral non-polymerisable mesogenic compounds in a preferred liquid-crystalline material used for the method according to the present invention as a whole, is preferably in the range from 0 to 30% by weight, more preferably in the range from 0 to 20% by weight and even more preferably in the range from 0 to 10% by weight.

Suitable polymerisable liquid-crystalline materials used for the method according to the present invention, may also comprise one or more dyes having an absorption maximum adjusted to the wavelength of the radiation used for polymerisation, in particular UV dyes like e.g. 4,4"-azoxy anisole or Tinuvin® dyes (from Ciba AG).

The polymerisable liquid-crystalline material used in accordance with the present invention, may also comprise one or more stabilizers or inhibitors to prevent undesired spontaneous polymerisation, preferably in an amount of 0 to 0.1%, very preferably 0 to 0.2%, for example selected from the commercially available Irganox® series (Ciba AG), like Irganox 1076.

In a preferred embodiment, the suitable polymerisable liquid-crystalline material used for the method according to the present invention comprises one or more monoreactive polymerisable non-mesogenic compounds, preferably in an amount of 0 to 50%, very preferably 0 to 20%. Typical examples are alkylacrylates or alkylmethacrylates, preferably isobornyl methacrylate.

In another preferred embodiment the polymerisable liquid-crystalline material used for the method according to the present invention, optionally comprises one or more di- or multireactive polymerisable non-mesogenic compounds, preferably in an amount of 0 to 50%, very preferably 0 to 20%, alternatively or in addition to the di- or multireactive polymerisable mesogenic compounds. Typical examples of direactive monomers are alkyldiacrylates or alkyldimethacrylates with alkyl groups of 1 to 20 C atoms or hexanediol diacrylate. Typical examples of multireactive monomers are trimethylpropanetrimethacrylate, or pentaerythritoltetraacrylate.

It is also possible to add one or more chain transfer agents to the polymerisable liquid-crystalline material in order to modify the physical properties of the polymer film. Especially preferred are thiol compounds, for example monoreactive thiols like dodecane thiol or multireactive thiols like trimethylpropane tri(3-mercaptopropionate). Very preferred are mesogenic or liquid-crystalline thiols as disclosed for example in WO 96/12209, WO 96/25470 or U.S. Pat. No. 6,420,001. By using chain transfer agents the length of the free polymer chains and/or the length of the polymer chains between two crosslinks in the polymer film can be controlled. When the amount of the chain transfer agent is increased, the polymer chain length in the polymer film decreases.

The polymerisable liquid-crystalline material in accordance with the present invention may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the polymerisable material does not contain a binder or dispersion auxiliary.

Said polymerisable liquid-crystalline material can additionally comprise one or more additional components like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

The polymerisable liquid-crystalline material used in accordance with the present invention is prepared in a manner conventional per se, for example by mixing one or more of the above-mentioned dichroic photoinitiator with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

For the method of the present invention, an especially preferred polymerisable liquid-crystalline material comprises:
  a) one or more achiral mono-, di- or multireactive polymerisable mesogenic compounds,
  b) one or more dichroic photoinitiator,
  c) optionally one or more polymerisable chiral compounds,
  d) optionally one or more stabilizers.
  e) optionally one or more mono-, di- or multireactive polymerisable non-mesogenic compounds,
  f) optionally one or more non-polymerisable chiral compounds
  g) optionally one or more dyes showing an absorption maximum at the wavelength used to initiate photopolymerisation,
  h) optionally one or more chain transfer agents,
  i) optionally one or more stabilizers.

The polymerisable liquid-crystalline material can be applied onto a substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the polymerisable liquid-crystalline material in a suitable solvent. This solution is then coated or printed onto the substrate, for example by spin-coating or printing or other known techniques, and the solvent is evaporated off before polymerisation. In most cases it is suitable to heat the mixture in order to facilitate the evaporation of the solvent. As solvents for example standard organic solvents can be used. The solvents can be selected for example from ketones such as acetone, methyl ethyl ketone, methyl propyl ketone or cyclohexanone; acetates such as methyl, ethyl or butyl acetate or methyl acetoacetate; alcohols such as methanol, ethanol or isopropyl alcohol; aromatic solvents such as toluene or xylene; halogenated hydrocarbons such as di- or trichloromethane; glycols or their esters such as PGMEA (propyl glycol monomethyl ether acetate), γ-butyrolactone, and the like. It is also possible to use binary, ternary or higher mixtures of the above solvents.

As a substrate for the method according to the present invention for example a glass or quartz plate or a plastic film or plate can be used. Suitable and preferred plastic substrates are for example films of polyester such as polyethylene-terephthalate (PET) or polyethylene-naphthalate (PEN), polyvinylalcohol (PVA), polycarbonate (PC) or triacetylcellulose (TAC), very preferably PET or TAC films. As birefringent substrates for example uniaxially stretched plastics film can be used. PET films are commercially available for example from DuPont Teijin Films under the trade name Melinex®. In particular preferred substrates are TAC, PET, PVA, PE films or glass plates.

Preferably, the coated substrates in accordance with the present invention are plane, but also structured substrates like e.g. Fresnel lenses can be used.

It is also possible to put a second substrate on top of the coated material prior to and/or during and/or after polymerisation. The substrates can be removed after polymerisation or not. When using two substrates, at least one substrate has to be transmissive for the actinic radiation used for the polymerisation. Isotropic or birefringent substrates can be used. In case the substrate is not removed from the polymer film after polymerisation, preferably isotropic substrates are used.

The irradiation in step b) according to the present invention is preferably performed by exposing the polymerisable liquid-crystalline material to linear polarized actinic radiation. Actinic radiation means irradiation with light, preferably UV light, IR light. In the process according to this invention the radiation wavelength should be selected such that it causes dissociation of the dichroic photoinitiator and polymerisation of the polymerisable compounds. In this regard, step b) is most preferably performed by exposing the polymerisable liquid-crystalline material to linear polarised UV radiation.

The radiation wavelength can be adjusted by UV band pass filters. The irradiation wavelength is preferably in the range from 250 nm to 450 nm, more preferably in the range from 320 nm to 390 nm. Especially preferred is an irradiation wavelength of about 365 nm.

As a source for UV radiation for example a single UV lamp or a set of UV lamps can be used. When using a high lamp power the curing time can be reduced. Another possible source for UV radiation is a laser.

The linear polarisation of the actinic radiation can be achieved by methods known to the expert. Preferably the linear polarisation is achieved by passing the radiation through a suitable linear polarizer (e.g. a commercially available dye-doped absorption polarizer).

The irradiation in step b) according to the present invention is performed at a temperature where the polymerisable liquid-crystalline material is in the isotropic phase. In a preferred embodiment, the irradiation is preferably performed at a temperature of 1 to 10° C. higher than the clearing point, more preferably at a temperature of 1 to 5° C. higher than the clearing point and most preferably at a temperature of 1 to 3° C. higher than the clearing point.

The irradiation in step b) according to the present invention is preferably performed under an inert gas atmosphere, preferably in a heated nitrogen atmosphere, but also irradiation in air is possible.

As described above, the polymerisable liquid-crystalline material used in the present invention comprises a dichroic photoinitiator. As with the common photoinitiators, dichroic photoinitiators dissociate when exposed to the correct wavelength and the formed radicals will initiate polymerisation of monomers. The dichroic photoinitiator used in the polymerisable liquid-crystalline material of the present invention has the property that the light absorption is dependent on the molecular orientation of the molecule. Therefore, when illuminated with said linear polarised UV light, polymerisation-initiating free radicals are predominantly produced where the local director lies parallel to the direction of polarisation. The local free-radical production results in different local polymerisation rates of the polymerisable liquid-crystalline material in the isotropic phase. The polymerisation rate of the liquid-crystalline molecules orientated parallel to the electric field of the linear polarized light proceeds faster than the polymerisation of the liquid-crystalline molecules orientated perpendicular to the electric field of the linear polarized light. As a result, the differences in the polymerisation rate prioritise domain formation parallel to the linear polarized UV light and finally induce, due to complete polymerisation and uniform alignment of the liquid-crystalline material in the polymer film, birefringence into the polymer film.

The curing time is dependent, inter alia, on the reactivity of the polymerisable liquid-crystalline material, the thickness of the coated layer, the type of polymerisation initiator and the power of the UV lamp. The curing time is preferably ≤5 minutes, very preferably ≤3 minutes, most preferably ≤1 minute. For mass production short curing times of ≤30 seconds are preferred.

A suitable UV radiation power is preferably in the range from 5 to 200 mWcm$^{-2}$, more preferably in the range from 50 to 175 mWcm$^{-2}$ and most preferably in the range from 100 to 150 mWcm$^{-2}$.

In connection with the applied UV radiation and as a function of time, a suitable UV dose is preferably in the range from 25 to 7200 mJcm$^{-2}$ more preferably in the range from 500 to 7200 mJcm$^{-2}$ and most preferably in the range from 3000 to 7200 mJcm$^{-2}$.

In a preferred embodiment, the liquid-crystalline molecules in the polymer film are aligned into planar orientation with regards to the substrate main plane. This planar orientation of the liquid-crystalline molecules in the resulting polymer film can be achieved, if the radiant source in step b) is located at an angle perpendicular to the substrate main plane.

In another preferred embodiment, the liquid-crystalline material in the polymer film is aligned into tilted orientation (>0°<90°) with regards to the substrate main plane which can be achieved if the radiant source is located at an oblique angle (>0°<90°) with regards to the substrate main plane. Preferably, the irradiation angle is >10°<80°, more preferable >20°<70° or more or even more preferable >30°<60°.

The present invention also relates to a polymer film obtained by the method described above and below.

The oriented polymer films of the present invention can be used as retardation or compensation film for example in LCDs to improve the contrast and brightness at large viewing angles and reduce the chromaticity. They can be used outside the switchable liquid-crystalline cell in an LCD, or between the substrates, usually glass substrates, forming the switchable liquid-crystalline cell and containing the switchable liquid-crystalline medium (incell application).

Various types of optical retarders are known. For example, an "A film" (or A-plate) is an optical retarder utilizing a layer of uniaxially birefringent material with its extraordinary axis oriented parallel to the plane of the layer. In this connection an "O film" (or O-plate) is an optical retarder utilizing a layer of uniaxially birefringent material with its extraordinary axis tilted at an angle to the plane of the layer.

Depending on the irradiation angle described above, the polymer film obtainable by the method according to the present invention can either be used as an A-plate (planar orientation of the liquid-crystalline molecules of the polymer film), if the radiant source in step b) is located at an angle perpendicular to the substrate main plane, or as an O-plate (tilted orientation of the liquid-crystalline molecules in the polymer film) if the radiant source is located at an oblique angle (>0°<90°) with regards to the substrate main plane.

The optical retardation ($\delta(\lambda)$) of a polymer film as a function of the wavelength of the incident beam ($\lambda$) is given by the following equation (6):

$$\delta(\lambda)=(2\pi\Delta n \cdot d)/\lambda \quad (6)$$

wherein ($\Delta n$) is the birefringence of the film, (d) is the thickness of the film and $\lambda$ is the wavelength of the incident beam.

According to Snellius law, the birefringence as a function of the direction of the incident beam is defined as $$\Delta n=\sin \Theta/\sin \Psi \quad (7)$$

wherein $\sin \Theta$ is the incidence angle or the tilt angle of the optical axis in the film and $\sin \Psi$ is the corresponding reflection angle.

Based on these laws, the birefringence and accordingly also optical retardation basically depends on the thickness of a film and the tilt angle of optical axis in the film (cf. Berek's compensator). Therefore, the skilled expert is aware that different optical retardations or different birefringence can be induced by adjusting the orientation of the liquid-crystalline molecules in the polymer film.

The birefringence ($\Delta n$) of the polymer film according to the present invention is preferably in the range from 0.01 to 0.30, more preferable in the range from 0.01 to 0.25 and even more preferable in the range from 0.01 to 0.16.

The thickness of the polymer film obtained by the method according to the present invention is preferably in the range from 3 to 30 µm, more preferable in the range from 3 to 20 µm and even more preferable in the range from 3 to 10 µm.

The optical retardation as a function of the tilt angle and the thickness of the polymer film obtained by the method according to the present invention is less than 200 nm, preferable less than 180 nm and even more preferable less than 150 nm.

The invention further relates to a method of preparing a polymer film comprising at least two regions with different birefringence, or comprising a pattern of two or more regions having different birefringence. The variation of birefringence leads to a variation of retardation in the different areas of the film.

Such a film can be prepared by the method as described above, wherein only selected parts of the polymerisable liquid-crystalline material are exposed to irradiation, e.g. by using a photomask, or wherein different parts of the polymerisable liquid-crystalline material are exposed to different intensities of irradiation, e.g. by using a shaded photomask with different areas having different transmission of irradiation or by using a radiation source with variable intensity.

Especially preferred is a polymer film according to the present invention that comprises a pattern of one or more, preferably one, two or three different regions having different values of the retardation, each of said values being adjusted such that its efficiency of converting linearly polarised light into circularly polarised light is optimized for light of one of the primary colours red, green and blue (R, G, B). In particular, said values of retardation correspond to a quarter of the wavelength of the respective colour and are preferably as follows:

For red light of a wavelength of 600 nm the retardation is from 140 to 190 nm, preferably 145 to 180 nm, very preferably 145 to 160 nm, most preferably 150 nm.

For green light of a wavelength of 550 nm the retardation is from 122 to 152 nm, preferably 127 to 147 nm, very preferably 132 to 142 nm, most preferably 137 nm.

For blue light of a wavelength of 450 nm the retardation is from 85 to 120 nm, preferably 90 to 115 nm, very preferably 100 to 115 nm, most preferably 112 nm.

The retardation of the film can be varied e.g. by varying the intensity and/or the duration of the irradiation.

The polymer film of the present invention can also be used as alignment film for other liquid-crystalline or RM materials. For example, they can be used in an LCD to induce or improve alignment of the switchable liquid-crystalline medium, or to align a subsequent layer of polymerisable liquid-crystalline material coated thereon. In this way, stacks of polymerised liquid-crystalline films can be prepared.

The polymer films of the present invention can be used in various types of liquid-crystalline displays, for example displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned) or PVA (patterned vertically aligned) mode; displays with bend or hybrid alignment like the OCB (optically compensated bend cell or optically compensated birefringence), R-OCB (reflective OCB), HAN (hybrid aligned nematic) or pi-cell ($\pi$-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase.

The present invention is described above and below with particular reference to the preferred embodiments. It should be understood that various changes and modifications may be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here. Unless the context clearly indicates otherwise, as used herein plural forms of the terms herein are to be construed as including the singular form and vice versa.

Throughout this application, unless explicitly stated otherwise, all concentrations are given in weight percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589 nm.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The invention will now be described in more detail by reference to the following examples, which are illustrative only and do not limit the scope of the invention.

EXAMPLES

Example 1

The following polymerisable liquid-crystalline material is prepared

| | |
|---|---|
| Compound (1) | 9.86% |
| Compound (2) | 56.39% |
| Compound (3) | 7.17% |
| Compound (4) | 2.00% |
| Compound (5) (dichroic photoinitiator) | 16.00% |
| Compound (6) (chiral RM) | 8.00% |
| BDH1533 | 0.50% |
| Irganox 1076 ® (stabilizer) | 0.08% |

Clearing point: 48.5° C.

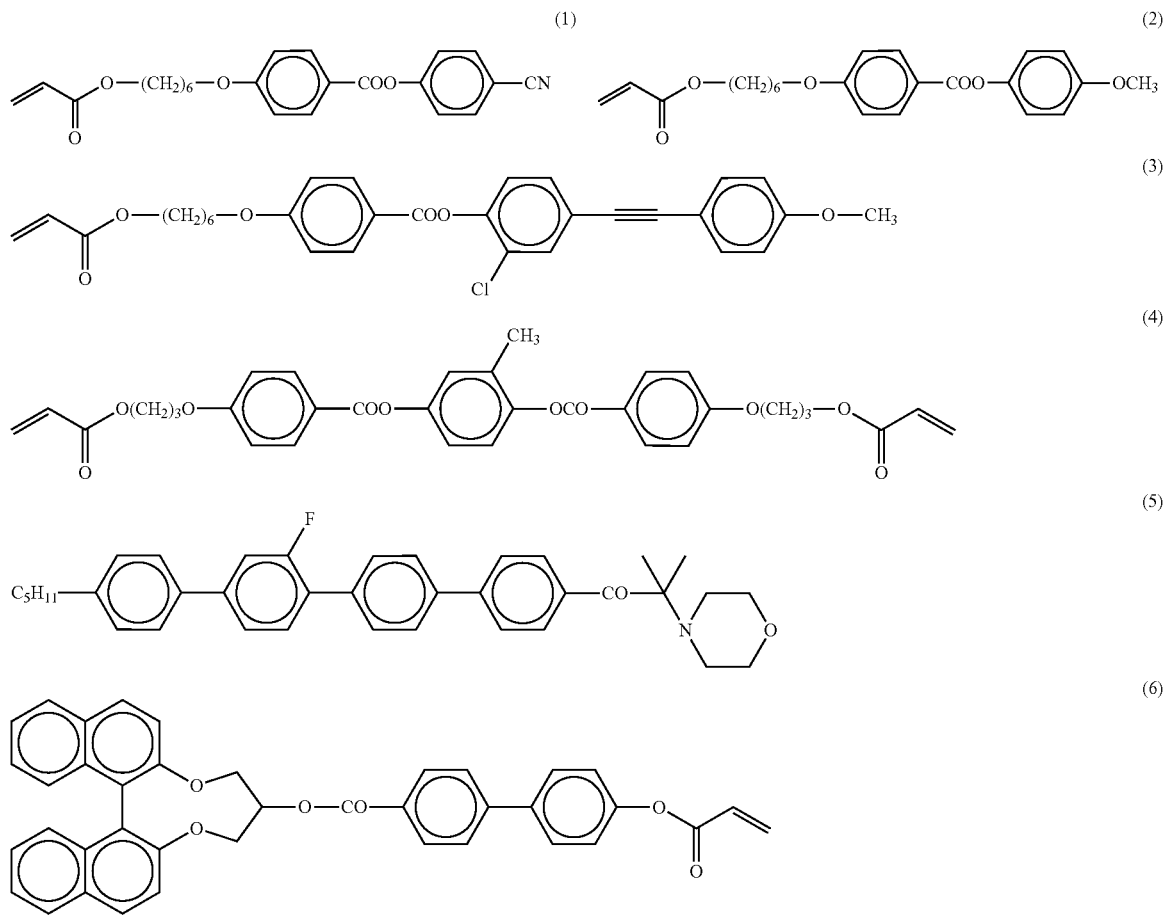

The polymerisable liquid-crystalline material is spin coated onto raw glass at 1000 rpm for 30 seconds. After annealing at 51° C. for 30 seconds, the material is exposed to polarized UV light (365 nm bandpass filter), at 120 mWcm$^{-2}$ for 40 seconds under nitrogen atmosphere at 51° C. The resulting polymer film has the following characteristics.

Film thickness=3.93 μm

Δn=0.0358

Figure 2:
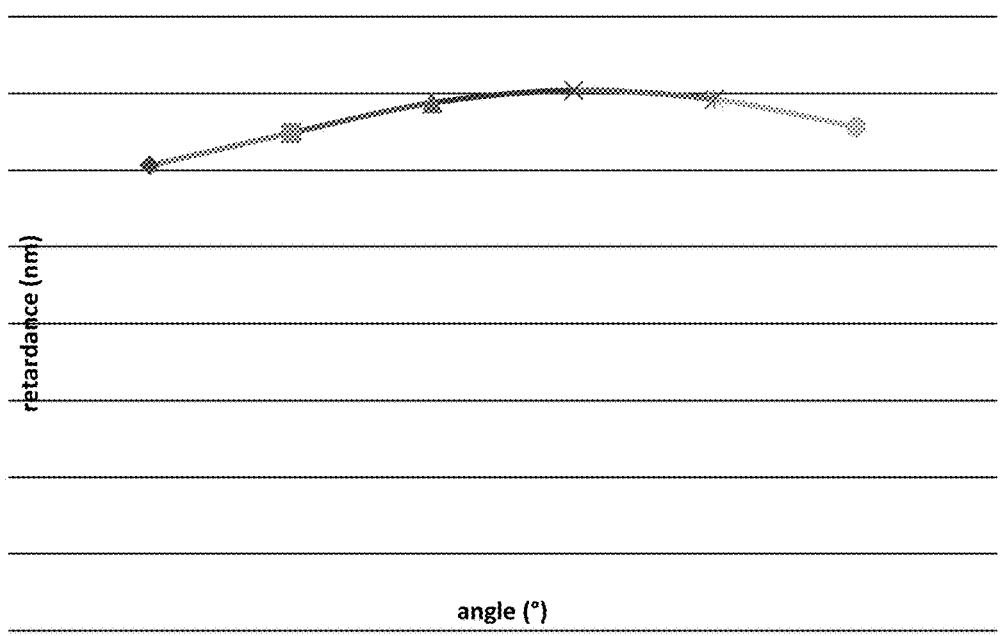
FIG. 2 depicts the retardation profile of a polymer film of example 1

The retardation profile of the polymer film is shown in FIG. 2, wherein the retardation is plotted against the viewing angle. As can be seen from FIG. 2, the retardation profile has a maximum at an viewing angle of 0°. This retardation profile is typical for an 'A-plate' wherein the ordinary axis (also called 'a-axis') of the LC material is oriented perpendicular to the plane of the layer, i.e. parallel to the direction of normally incident light.

Example 2

The following polymerisable liquid-crystalline material is prepared

| Compound (1) | 11.1% |
| Compound (2) | 63.72% |
| Compound (3) | 8.00% |
| Compound (4) | 5.00% |
| Compound (5) (dichroic photoinitiator) | 4.00% |
| Compound (6) (chiral RM) | 8.00% |
| Tego ®Rad 2500 | 0.10% |
| Irganox 1076 ® (stabilizer) | 0.08% |

Clearing point: 48.5° C.

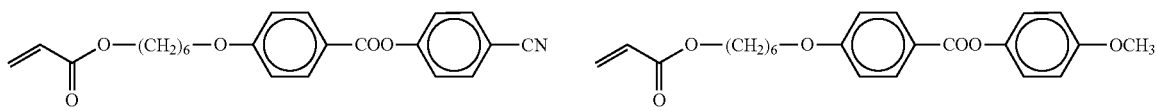

(1)

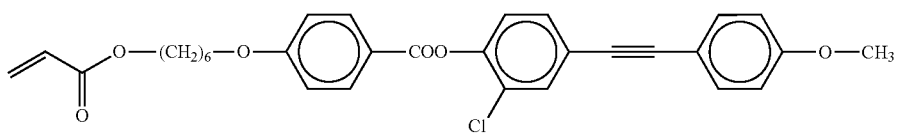

(2)

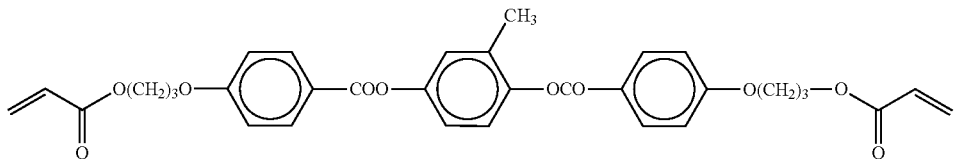

(3)

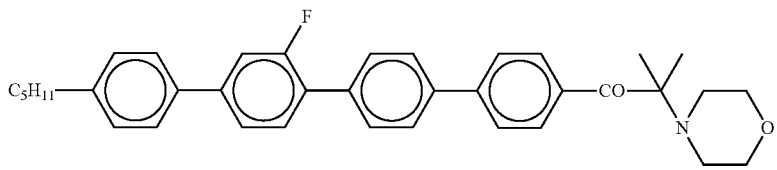

(4)

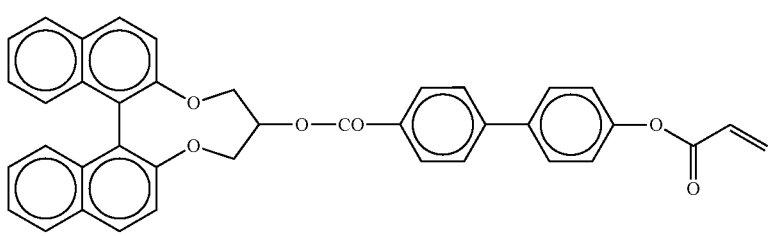

(5)

(6)

The polymerisable liquid-crystalline material is spin coated onto raw glass at 1000 rpm for 30 seconds. After that, the material is exposed to polarized UV light (365 nm bandpass filter), at 120 mWcm$^{-2}$ for 40 seconds under nitrogen atmosphere at 53° C. The resulting polymer film has the following characteristics.

Film thickness=3.03 μm
Δn=0.0253

Figure 3:
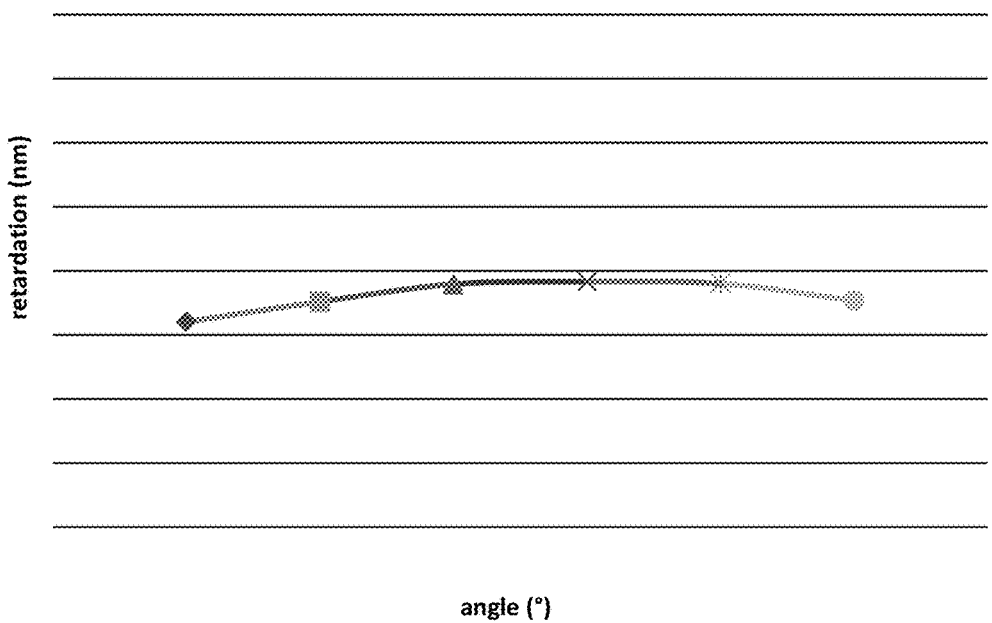
FIG. 3 depicts the retardation profile of a polymer film of example 2

The retardation profile of the polymer film is shown in FIG. 3, wherein the retardation is plotted against the viewing angle. As can be seen from FIG. 3, the retardation profile has a maximum at an viewing angle of 0°. This retardation profile is typical for an 'A-plate' wherein the ordinary axis (also called 'a-axis') of the LC material is oriented perpendicular to the plane of the layer, i.e. parallel to the direction of normally incident light.

Example 3

The following polymerisable liquid-crystalline material is prepared

| | |
|---|---|
| Compound (1) | 40.23% |
| Compound (2) | 40.23% |
| Compound (3) | 5.46% |
| Compound (4) (dichroic photoinitiator) | 4.00% |
| Paliocolor LC 756 ® (chiral RM) | 10.00% |
| Irganox 1076 ® (stabilizer) | 0.08% |

Clearing point: 41.9° C.

The polymerisable liquid-crystalline material is spin coated onto raw glass at 600 rpm for 30 seconds. After that, the material is exposed to polarized UV light (365 nm bandpass filter), at 35 mWcm$^{-2}$ for 30 seconds under nitrogen atmosphere at 43° C.

Figure 4:
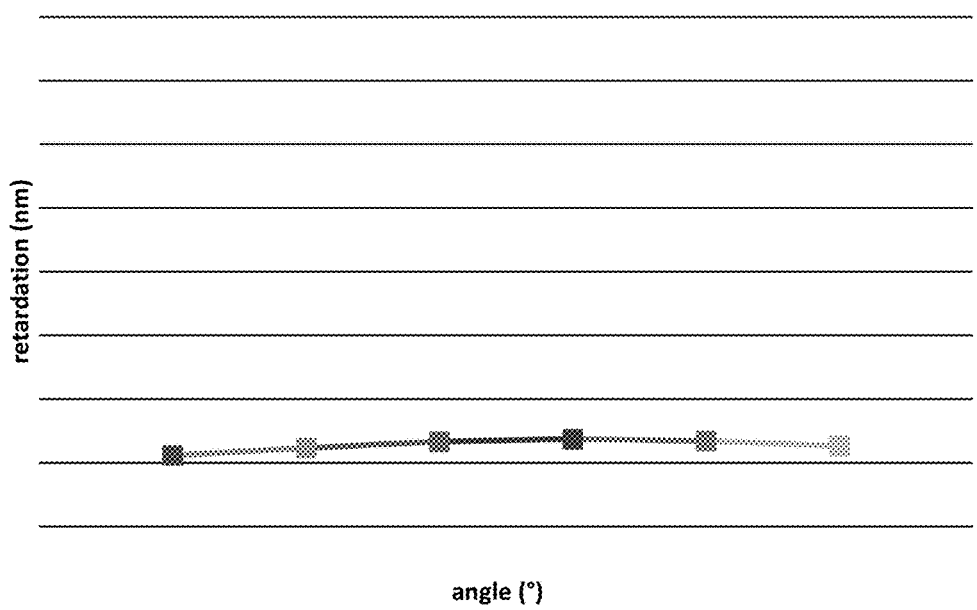
FIG. 4 depicts the retardation profile of a polymer film of example 3

The retardation profile of the polymer film is shown in FIG. 4, wherein the retardation is plotted against the viewing angle. As can be seen from FIG. 4, the retardation profile has a maximum at an viewing angle of 0°. This retardation profile is typical for an 'A-plate' wherein the ordinary axis (also called 'a-axis') of the LC material is oriented perpendicular to the plane of the layer, i.e. parallel to the direction of normally incident light.

Example 4

Angle Dependency of the Radiation Source

| | |
|---|---|
| Compound (1) | 35.71% |
| Compound (2) | 35.71% |
| Compound (3) | 10.00% |
| Compound (4) | 2.00% |
| Compound (5) (dichroic photoinitiator) | 8.00% |
| Compound (6) (chiral RM) | 8.00% |
| BDH1533 | 0.50% |
| Irganox 1076 ® (stabilizer) | 0.08% |

Clearing point: 48.9° C.

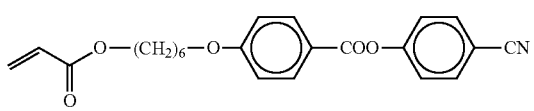

(1)

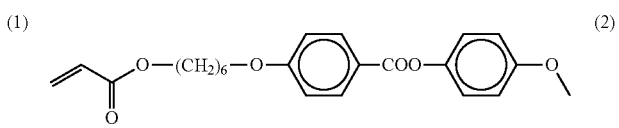

(2)

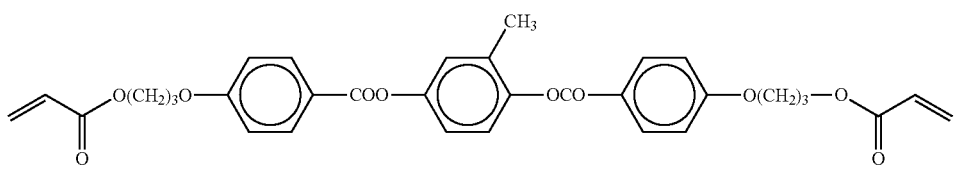

(3)

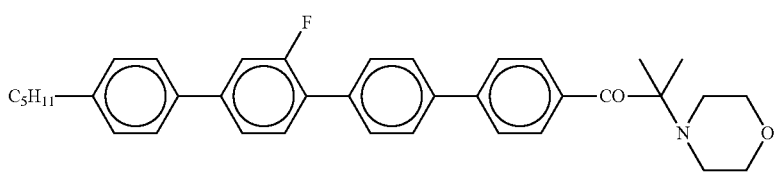

(4)

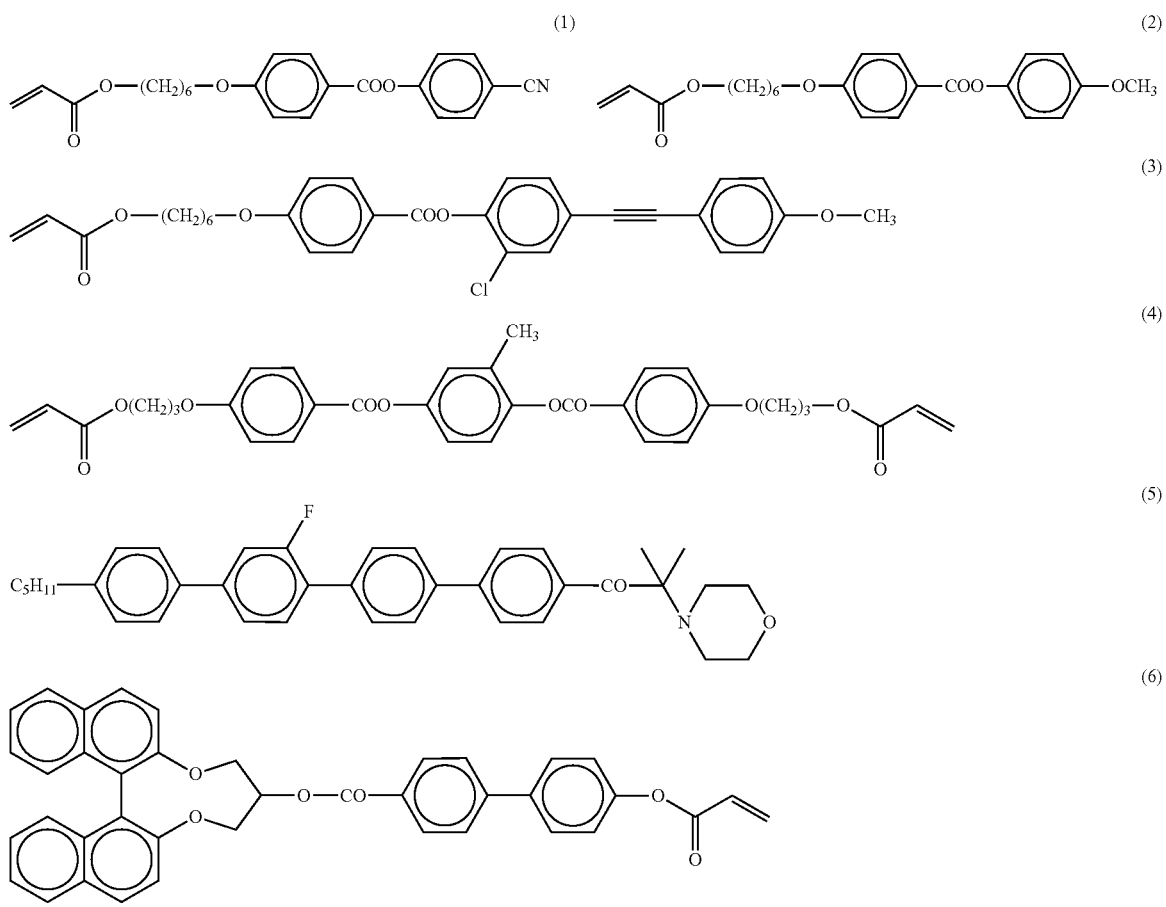

The polymerisable liquid-crystalline materials are each spin coated onto raw glass at 1000 rpm for 30 seconds. After that, the materials are exposed to polarised UV light (365 nm bandpass filter) each at different oblique angles of the radiation source (40°, 50°, 60°, 70° and 90°) at 50 mWcm$^{-2}$ for 30 seconds under nitrogen atmosphere at 51° C. The resulting polymer films have the following characteristics.

Film thickness=3.31 μm

Δn=0.0272.

Figure 5:
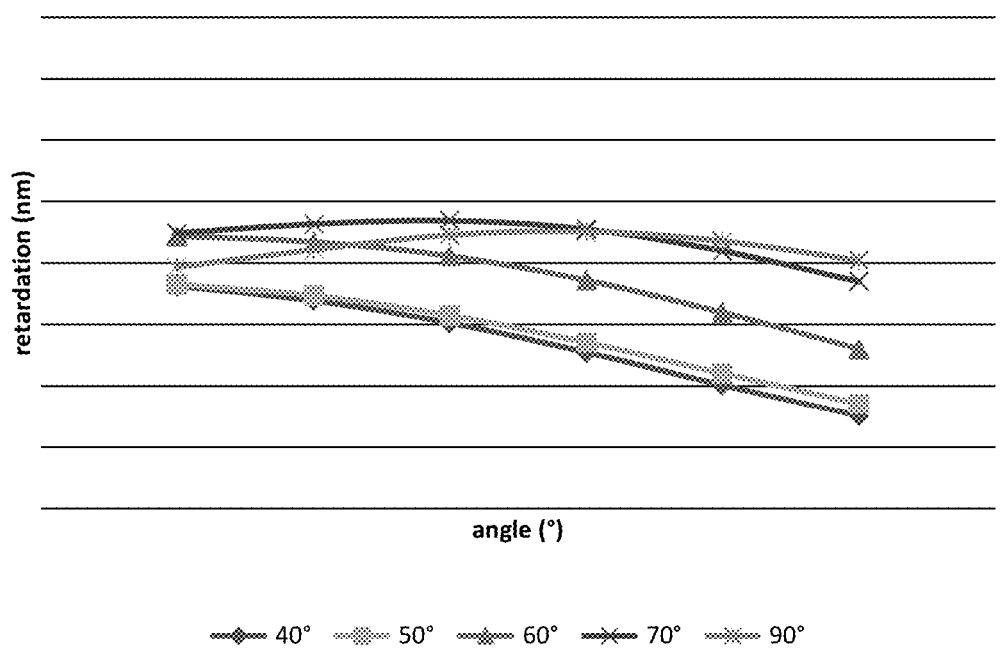
FIG. 5 depicts the retardation profiles of the polymer films of example 4 (angle dependency of the radiation source).

The retardation profiles of the polymer films are shown in FIG. 5, wherein the corresponding retardations are each plotted against the viewing angle. As can be seen from FIG. 5, the retardation profile for a polymer film obtained by irradiation at an angle of 90° (cf. α in FIG. 1) has a maximum value for the retardation at a viewing angle of 0°. This retardation profile is typical for an 'A-plate' wherein the ordinary axis (also called 'a-axis') of the LC material is oriented perpendicular to the plane of the layer, i.e. parallel to the direction of normally incident light. In dependency of the irradiation angle (α in FIG. 1) the retardation profiles change stepwise from a typical 'A-plate' retardation profile (cf. 90°) to a typical "O plate" retardation profile (cf. 50° or 40°). In an "O plate", the extraordinary axis of the LC material is tilted with regards to the plane of the layer resulting here in a maximum value for the retardation at a viewing angle of −60°.

The invention claimed is:

1. A method of preparing a polymer film comprising the following steps:
   a) providing a layer of a polymerisable liquid-crystalline material comprising at least one dichroic photoinitiator onto a substrate,
   b) irradiating the liquid-crystalline material in its isotropic phase with linear polarised light, wherein a polymerized film is formed that has uniform alignment, wherein the uniform alignment is a result of only the irradiation and the resulting polymer film exhibits uniform alignment, and
   c) optionally removing the polymerised film from the substrate.

2. The method according to claim 1, wherein step b) is performed at a temperature of 1 to 5° C. higher than the clearing point of the liquid-crystalline material.

3. The method according to claim 1, wherein the polymerisable liquid-crystalline material comprises at least one mono-, di- or multireactive polymerisable mesogenic compound, and at least one dichroic photoinitiator.

4. The method according to claim 1, wherein the polymerisable liquid-crystalline material comprises at least one monoreactive polymerisable mesogenic compound, at least one di- or multireactive polymerisable mesogenic compound, and at least one dichroic photoinitiator.

5. The method according to claim 1, wherein the polymerisable liquid-crystalline material comprises at least one monoreactive chiral polymerisable mesogenic compound, at least one mono-, di- or multireactive achiral polymerisable mesogenic compound, and at least one dichroic photoinitiator.

6. The method according to claim 1, wherein the polymerisable liquid-crystalline material comprises at least one di- or multireactive chiral polymerisable mesogenic compound, at least one mono-, di- or multireactive achiral polymerisable mesogenic compound, and at least one dichroic photoinitiator.

7. The method according to claim 1, wherein the polymerisable liquid-crystalline material comprises at least one non-polymerisable chiral compound, at least one mono-, di- or multireactive achiral polymerisable mesogenic compound and at least one dichroic photoinitiator.

8. The method according to claim 1, wherein the dichroic photoinitiator is a compound of formula I,

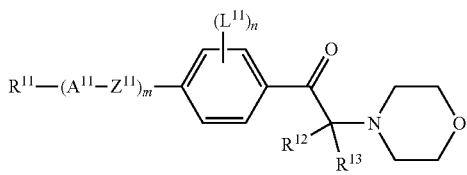

wherein
P is a polymerisable group,
Sp is a spacer group or a single bond,
$A^{11}$ is, in case of multiple occurrence independently of one another, an aryl-, heteroaryl-, aliphatic or heterocyclic group optionally being substituted by one or more identical or different groups L,
$Z^{11}$ is, in each occurrence independently from each other, —O—, —S—, —CO—, —COO—, —OCO—, —S—CO—, —CO—S—, —O—COO—, —CO—NR$^{10}$—, —NR$^{01}$—CO—, —NR$^{01}$—CO—NR$^{02}$, —NR$^{01}$—CO—O—, —O—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—CH=CH—, or a single bond,
m is 0, 1, 2 or 3,
r is 0, 1, 2, 3 or 4,
L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms,
$R^{11-13}$ are, independently of each other, H, halogen, CN, NO$_2$, NCS, SF$_5$, P-Sp- or straight chain or branched alkyl with 1 to 20 C-atoms that is optionally mono- or polysubstituted by F, Cl, Br, I or CN, and wherein one or more non-adjacent CH$_2$ groups are optionally replaced, in each case independently from one another, by —O—, —S—, —NR$^{01}$—, —SiR$^{01}$R$^{02}$—, —CO—, —COO—, —OCO—, —OCO—O—, —NR$^{01}$—CO—, —CO—NR$^{01}$—, —NR$^{01}$—CO—NR$^{02}$—, —S—CO—, —CO—S—, —CY$^{01}$=CY$^{02}$— or —C≡C— in such a manner that O and/or S atoms are not linked directly to one another,
$Y^{01}$ and $Y^{02}$ each, independently of one another, denote H, F, Cl or CN, and
$R^{01}$ and $R^{02}$ are, in dependently of each other, H, or straight chain or branched alkyl with 1 to 20 C-atoms.

9. The method according to claim 1, wherein the proportion of the dichroic photoinitiator in the liquid-crystalline material as a whole is in the range of 1 to 20% by weight.

10. The method according to claim 1, wherein the substrate is a TAC, PET, PVA, PE film or glass plate.

11. The method according to claim 1, wherein step b) is performed by exposing the polymerisable liquid-crystalline material to linear polarised UV radiation.

12. The method according to claim 1, wherein the Δn of the polymer film is in the range of 0.01 to 0.30.

13. The method according to claim 1, wherein the UV radiation power is in the range of 5 to 200 mW cm$^{-2}$.

14. The method according to claim 1, wherein the UV dose is in the range of 25 to 7200 mJ cm$^{-2}$.

15. The method according to claim 1, wherein the polymerisable liquid-crystalline material is aligned into planar orientation with regards to the substrate main plane.

16. The method according to claim 1, wherein the polymerisable liquid-crystalline material is aligned into tilted orientation (>0°<90°) with regards to the substrate main plane.

17. The method according to claim 1, wherein the irradiation in step b) is performed at an oblique angle (>0°<90°) with regards to the substrate main plane.

18. The method according to claim 1, wherein the thickness of the polymer film is in the range of 3 to 30 μm.

19. The method according to claim 1, wherein the optical retardation of the polymer film is less than 200 nm.

20. The method according to claim 1, wherein the polymerised film is an A-plate or tilted O-plate.

21. A method of preparing a polymer film comprising the following steps:
a) providing a layer of a polymerisable liquid-crystalline material comprising at least one dichroic photoinitiator onto a substrate, which substrate is not a rubbed plastic substrate and/or does not contain an alignment layer,
b) irradiating the liquid-crystalline material in its isotropic phase with linear polarised light, wherein a polymerized film is formed that has uniform alignment, wherein the uniform alignment is a result of only the irradiation and the resulting polymer film exhibits uniform alignment, and
c) optionally removing the polymerised film from the substrate.

* * * * *